(12) United States Patent
Kepley et al.

(10) Patent No.: US 6,186,576 B1
(45) Date of Patent: Feb. 13, 2001

(54) BEDCOVER SUSPENSION/ACCESS SYSTEM

(76) Inventors: Bruce L. Kepley, 7816 Prestwick Cir., San Jose, CA (US) 95135; Robert M. Farnam, 474 Lindbergh Ave., Livermore, CA (US) 94550

( * ) Notice: Under 35 U.S.C. 154(b), the term of this patent shall be extended for 0 days.

(21) Appl. No.: 08/974,489

(22) Filed: Nov. 19, 1997

(51) Int. Cl.[7] .................................................... B50P 7/02
(52) U.S. Cl. ................................. 296/100.1; 296/100.06
(58) Field of Search ........................ 296/100.06, 100.07, 296/100.08, 100.09, 100.1

(56) References Cited

U.S. PATENT DOCUMENTS

| | | | |
|---|---|---|---|
| 2,989,340 | * | 6/1961 | Penner ................................ 296/100.1 |
| 3,051,523 | * | 8/1962 | Boyce-Smith et al. ..... 296/100.07 X |
| 3,762,762 | * | 10/1973 | Beveridge et al. ................ 296/100.1 |
| 4,101,162 | * | 7/1978 | Koehn ................................ 296/100.1 |
| 4,756,571 | * | 7/1988 | Lake .................................. 296/100.1 |
| 5,294,097 | | 3/1994 | Thomsen et al. . |
| 5,632,522 | * | 5/1997 | Gaitan et al. .................... 296/100.06 |
| 5,904,383 | * | 5/1999 | Yoder .......................... 296/100.07 X |
| 5,971,446 | * | 10/1999 | Lunney, II .................. 296/100.06 X |

* cited by examiner

*Primary Examiner*—Joseph D. Pape
(74) *Attorney, Agent, or Firm*—Liniak, Berenato, Longacre & White

(57) ABSTRACT

A rigid bedcover and suspension/access system that provides substantially uniform and stable suspension throughout the angle of travel of the bedcover from the fully closed position to the fully open position. An offset hinge pivotally supports the bedcover and a counterbalanced suspension system suspends the pivoting bedcover with a substantially constant force throughout its path of travel from a fully closed position at 0 degrees to a fully open position at approximately 90 degrees. The counterbalanced suspension system of this invention does not require the hydraulic piston required by the prior art and provides a counterbalancing force and stable opening at every angle.

15 Claims, 8 Drawing Sheets

BEDCOVER SUSPENSION/ACCESS SYSTEM

BACKGROUND OF THE INVENTION a) Field of the Invention

This invention relates to truck bedcovers, and specifically to rigid or hard bedcovers used to cover the cargo bed area of trucks while permitting easy access to the cargo bed area. The bedcover set forth in this application is designed to pivot with respect to the truck bed.

b) Description of the Related Art

Conventional bedcovers are mounted through a hinge at the forwardmost wall of the truck bed and in operation lift at the tailgate end of the truck bed for access by the operator. The angular position of the bedcover is typically regulated by a hydraulic piston mounted at a mid-point of the truck bed sidewalls. FIG. 1 illustrates the conventional truck bedcover and access system. The angle range of operation is limited by the conventional bedcover suspension system permitting an approximate maximum angle of access of about 30 degrees. The conventional bedcover designs suffer from the following drawbacks:

1. Restricted cargo placement and operator access to the truck bed as a result of the limited angle range of displacement of the truck bedcover.

2. Danger of physical strain and discomfort for the operator while loading and unloading. As a result of the limited angle of displacement of the bedcover (about 30 degrees), an operator must crawl on hands and knees, or somehow maneuver his/her body under the plane of the bedcover to access the forward cargo area. Alternatively, the operator must grope blindly with his/her hands while standing outside the rails near the cab in order to access contents located in the forward portion of the cargo bed.

The conventional bedcover suspension system is designed to counteract the force of gravity with one predetermined force value. Thus, only one counterbalanced angle of suspension is attained. Suspension in angles below the predetermined angle will not occur, and suspension beyond or above the predetermined angle will occur but require the operator to deliver a strong, uncomfortable counteracting force to initiate closure of the bedcover. Most conventional bedcover systems incorporate both features; that is, no suspension near the closed position with suspension designed to occur at a point 40%–70% of the angle of operation and beyond to the fully open position.

In recognition of the above prior art design, the operator must lift the bedcover to the predetermined angle before suspension occurs. A short operator may not be able to lift the bedcover to the angle height required to engage suspension, or the bedcover in a suspended position is too high for the short person to close. The operator may not have the physical strength to lift the bedcover to the suspension angle, nor the strength to counteract the suspension force at the fully open position when closing the bedcover.

Additionally, the present invention provides a rigid bedcover made from stainless steel or polished aluminum wherein at least the interior surface of the bedcover facing the cargo area is polished to provide a reflective surface. A number 6 or higher grade polish is preferred to achieve the reflective characteristics sought by this invention.

In summary, the conventional hard bedcover does not offer a true counterbalance system or provide suspension through most of the angles of operation, but rather a single-force resistance value to ameliorate a portion of the forces for the operator and suspension at an arbitrary angle and above.

SUMMARY OF THE INVENTION

The present invention seeks to overcome the drawback inherent in the prior art by providing a rigid bedcover and suspension/access system that provides substantially uniform and stable suspension throughout the angle of travel of the bedcover from the fully closed position to the fully open position.

The bedcover of this invention is designed with an offset hinge located at a predetermined distance from the forward wall of the truck bed and a counterbalanced system that suspends the pivoting bedcover with a substantially constant force throughout its path of travel from a fully closed position at 0 degrees to a fully open position at approximately 90 degrees. The counterbalanced suspension system of this invention does not require the hydraulic piston provided in the prior art and provides uniform stability at every opening angle.

The offset hinge design which C-shaped hinge arm enables the hinge axis to be located inside the cargo bed area permitting integrity of seal operation without drilling or modifying the sheet metal body of the truck, while providing "flush" mounting of the bedcover to the inside of the truck bed rails, thereby providing the finish preferred by style-conscious truck owners.

The proposed counterbalanced suspension system gives the operator the ability to choose from a full range of bedcover operation/access angles to provide for the full spectrum of needs. With the suspension system of this invention, a bedcover opening of one degree will provide air ventilation of the cargo area while maintaining privacy of the cargo area and stable positioning of the bedcover. Opening of the bedcover to 30 degrees will provide stability and full access at the tailgate area depending on the operator height and truck suspension design. Opening of the bedcover up to 90 degrees will provide increased access from outside the truck along the rails and increased access from the tailgate with unrestricted head and body clearance for the operator in the 90 degree fully open position while standing in the bed.

These and other objectives of the present invention will become more apparent with reference to the following drawings and associated detailed description thereof.

DETAILED DESCRIPTION OF THE PREFERRED EMBODIMENTS

Figure 1:
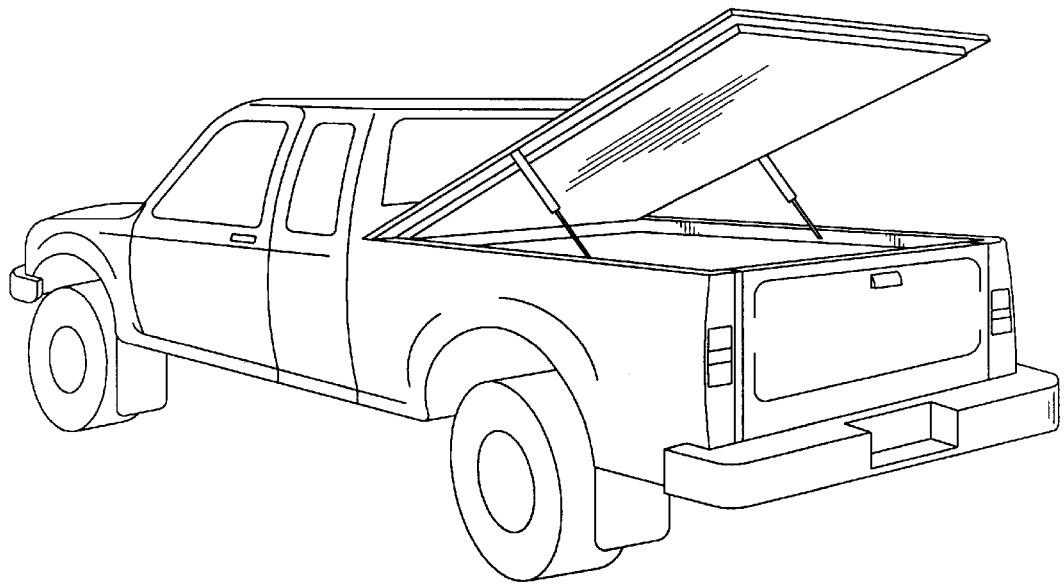
FIG. 1 is an illustration embodying the prior art wherein a bedcover is hinged at the forward wall of the truck bed and the bedcover is suspended by a piston member.
Figure 2:
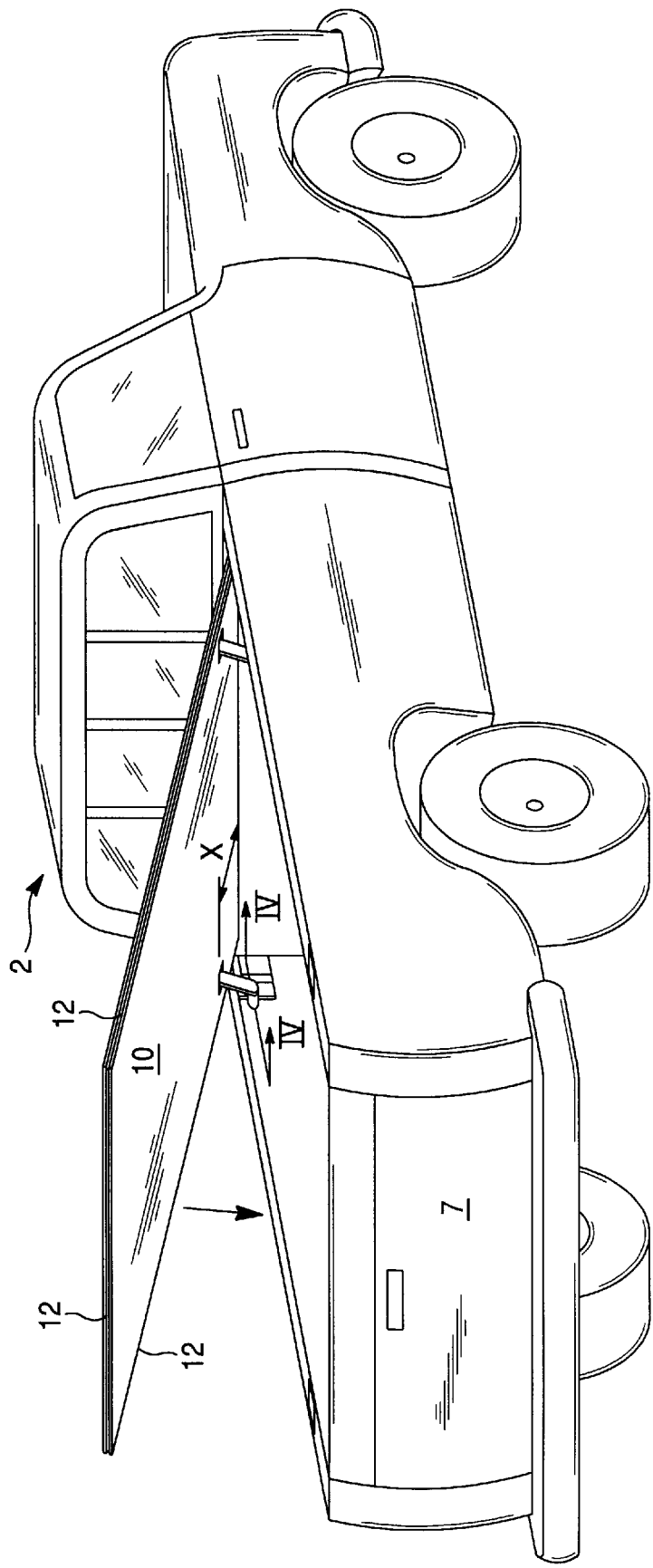
FIG. 2 is a perspective view of a truck employing the bedcover assembly of this invention.

FIG. 2 shows a truck 2 employing the rigid bedcover 10 of this invention in a partial opened position. As clear from FIG. 2, the rigid bedcover 10 is fixed to the truck bed via a suspension system comprising an offset hinge disposed at a distance 'X' from the forward wall 5 of the truck bed or cargo area. In the preferred embodiment, the axis of the offset hinge is located about 4–6 inches from the forward sidewall of the truck bed of a typical truck bed.

The offset hinge design described below enables the hinge axis to be located inside the cargo bed area permitting integrity of seal operation without drilling or modifying the sheet metal body of the truck, while providing "flush" mounting of the bedcover to the inside of the truck bed rails, thereby providing the "flush" finish position of the cover preferred by style-conscious truck owners.

It should be noted that the bedcover 10 of this invention has a rigid design and is formed with a peripheral edge 12 having a perimeter that matches the inner periphery of the truck bed walls 4, 5, 6. Truck cargo areas and shapes vary greatly with each vehicle, therefore, the bedcover 10 of this invention is adapted to be reconfigured to match any conceivable design.

Figure 3:
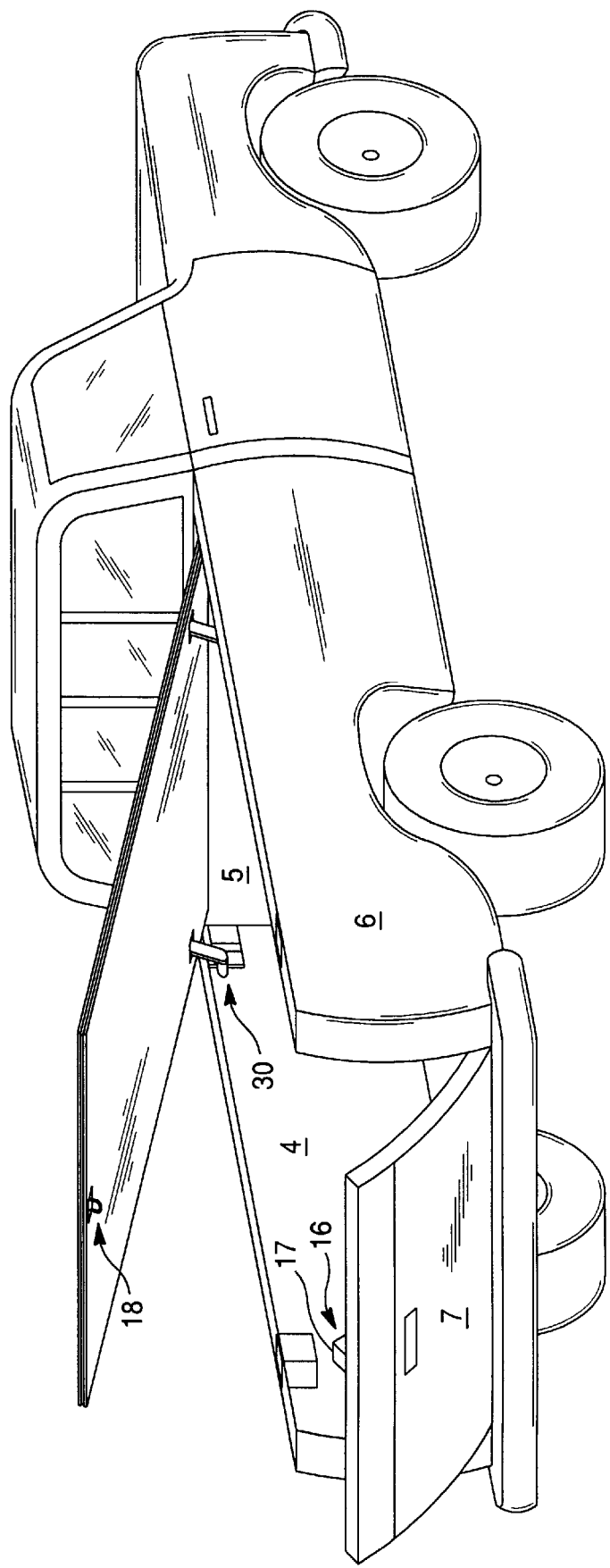
FIG. 3 is a modified design of the embodiment shown in FIG. 2 wherein a latch mechanism is employed for added security and interacts with the tailgate.

To enhance security, a latch mechanism 16 may be provided at the tailgate 7 which interacts with the bedcover 10 to prevent access to the cargo area. In the preferred embodiment, the latch 16 comprises a non-compressive shock absorbing cylinder stock 17 mounted to the tailgate 7 which is disengaged from a hook 18 mounted to the underside of the bedcover 10 when the tailgate 7 is pivoted to a lowered position (see FIG. 3). Thus, disengagement of the latch mechanism 16 first requires the tailgate to be lowered.

FIG. 2 generally shows the hinge and suspension mechanism 30 of this invention which enables the bedcover 10 to be opened and retained at an infinite number of positions throughout the path of travel of the bedcover. That is, the suspension system 30 of the present invention utilizes a counterbalancing arrangement to apply a uniform force to the bedcover to retain the same at a variety of opened positions. With the suspension system of this invention, a bedcover opened to a small angle (for example, one to five degrees) will provide air ventilation of the cargo area while maintaining privacy of the cargo area. More importantly, the suspension system will maintain a stable position of the bedcover when slightly ajar. Opening the bedcover to a greater angle of inclination will still provide stability while enabling full access at the tailgate area. Fully opening the bedcover to an angle of approximately 90 degrees will provide increased access from outside the truck along the rails and increased access from the tailgate with unrestricted head and body clearance for the operator in the 90 degree fully open position while standing in the bed.

Figure 4:
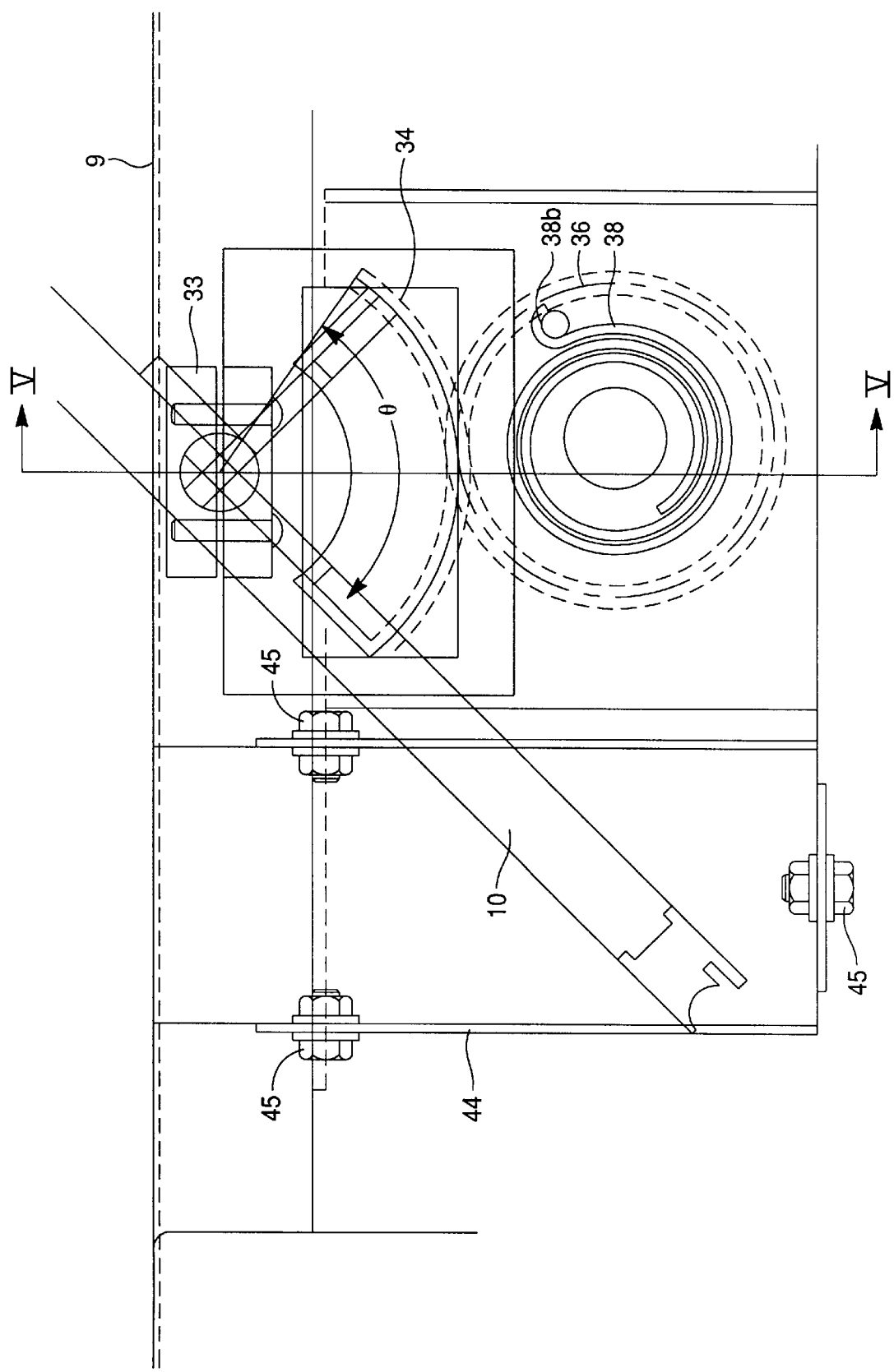
FIG. 4 is a cross sectional view of the suspension system as viewed in the direction of cross sectional lines IV—IV of FIG. 2.

The suspension system 30 of the present invention will now be described with reference to FIGS. 4–6. FIG. 4 is a cutaway view of the suspension system 30 as viewed in the direction of cross sectional lines IV—IV of FIG. 2. The offset hinge of the invention comprises a C-shaped hinge arm 32 fastened to the bedcover 10 in a suitable manner, i.e., screws 32' (see FIG. 5). The suspension system 30 further comprises a first gear member 34 fixed to hinge arm 32; the first gear member comprises gear teeth 34a spanning an arc 'θ' of at least 90 degrees. Matingly engaging the first gear member 34 is second gear member 36 pivotally supported with respect to the truck bed. The second gear member 36 transmits torque from the first gear member 34 to a power spring 38 which is fixed at one end 38a to the truck bed and fixed at the other end 38b to the second gear member 36. In the preferred design, the power spring 38 is recessed within the second gear member 36 to provide a compact yet durable arrangement to counterbalance the torque generated by the pivoted bedcover 10.

Figure 5:
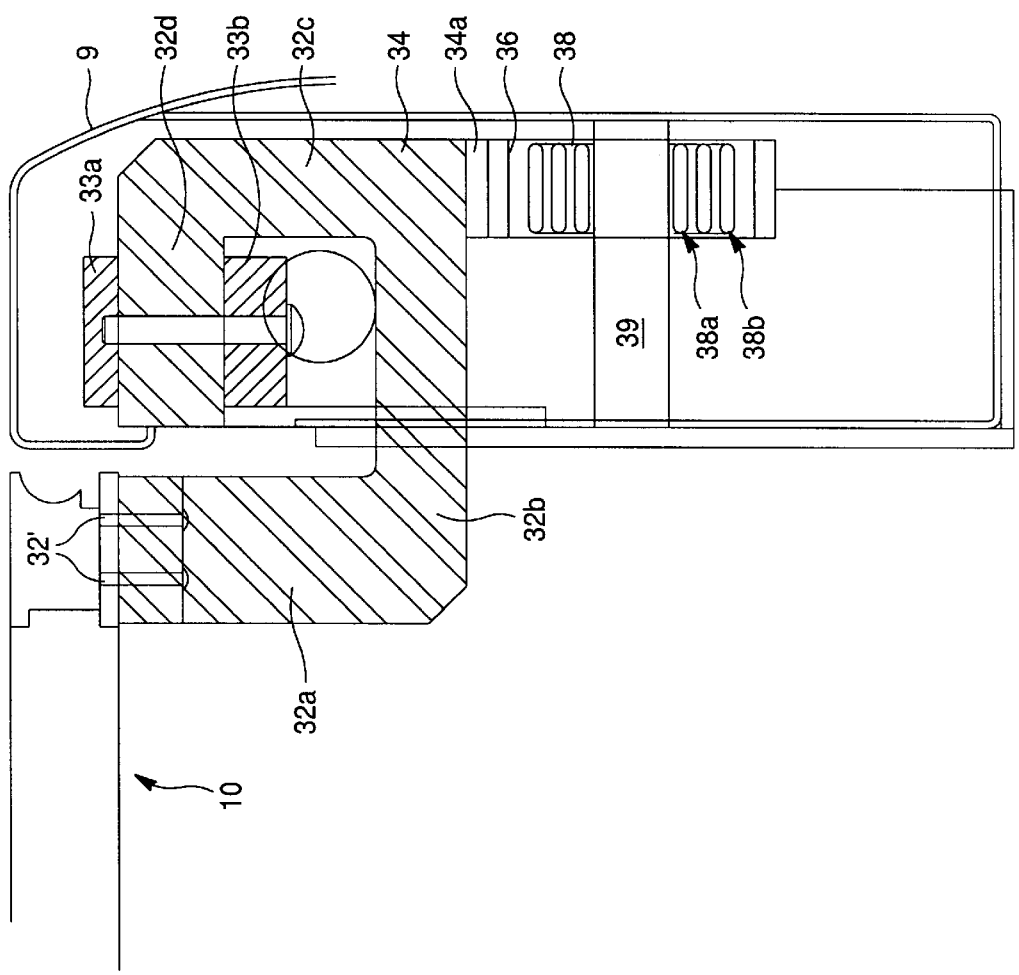
FIG. 5 is a cross sectional view of the suspension system as viewed in the direction of cross section lines V—V of FIG. 4.

FIG. 5 shows the suspension system 30 as viewed in the direction of cross section lines V—V of FIG. 4 when the bedcover 10 is in the closed position. As shown in FIG. 5, the hinge arm 32 is design to be well-balanced and compact to thereby enable a 90 degree pivoting motion without interfering or penetrating with the truck bed sidewalls. The C-shaped hinge arm 32 comprises first fastening leg 32a having a means for affixing the hinge arm 32 to the bedcover 10. The hinge arm further comprises second and third legs 32b, 32c which wrap around the flange 9 defining the top surface of the truck sidewall. The first gear member 34 is fixed in a suitable manner to the second and third legs 32b, 32c in order to transmit torque from the bedcover 10 to the second gear member 36. In the preferred design, the first gear member 34 is formed as part of the third leg 32c to provide gear teeth 34a at the lower face of the third leg 32c of the hinge arm 32. In FIG. 6, the fourth leg 32d is shown to be wider than the lower second leg 32b.

Figure 7:
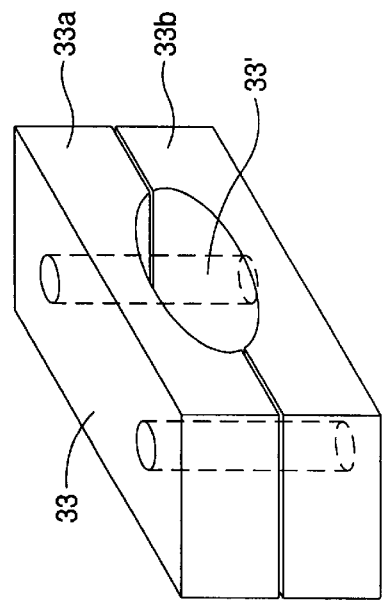
FIG. 7 is a perspective view of the split bearing member of the present invention.

A fourth leg 32d of the hinge arm 32 engages a split bearing 33 mounted under the flange 9 of the sidewall. The two-piece shape of the split bearing member 33 is shown more clearly in FIG. 7. The design of the split bearing 33 (i.e., two-pieces 33a, 33b) enables accurate setting and adjustment of a fixing force that aids to retain the bedcover 10 in any one of an infinite number of fixed positions throughout its path of travel. Thus, when the bedcover 10 is pivoted to a desired position, the frictional resistance of the bearing 33 aids to retain the bedcover at a fixed position to compensate for external forces incidental on occasion, i.e. parking on grade, light wind, vibration from cargo area during loading and unloading, incidental bumping, etc., while permitting easy adjustment of the angle of inclination of the bedcover 10.

The offset hinge design having a C-shaped hinge arm 32 enables the hinge axis to be located inside the cargo bed area permitting integrity of seal operation without drilling or modifying the sheet metal body of the truck, while providing a flush positioning of the bedcover to the inside of the truck bed rails, thereby maintaining the "flush" finish position of the cover preferred by style-conscious truck owners.

The power spring 38 provides a resiliency force to the second gear member 36 in order to supply a constant force of resistance to the torque transmitted from the bedcover 10 when pivoted from the closed position to the opened position regardless of the angle of inclination of the bedcover 10.

Figure 6:
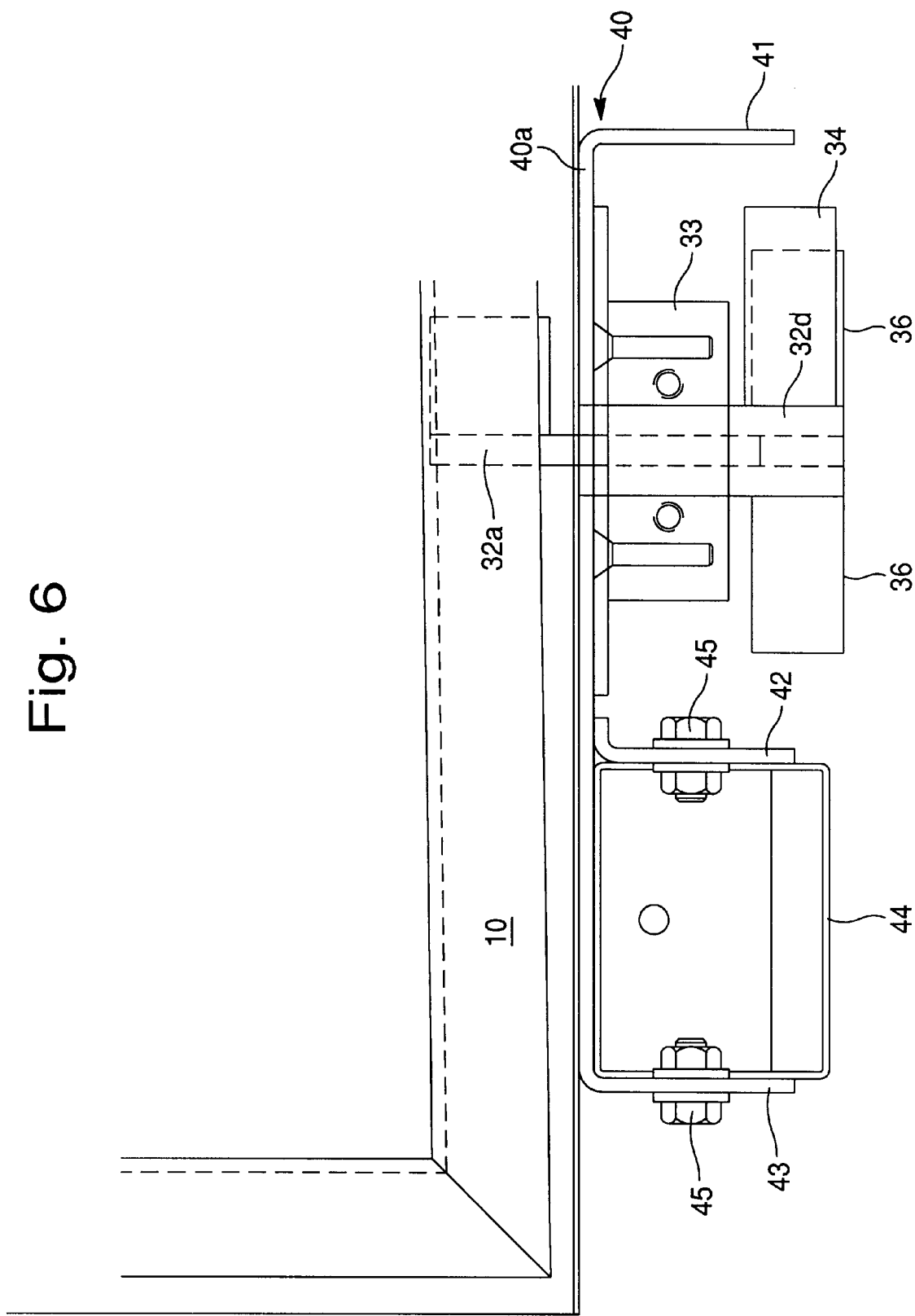
FIG. 6 illustrates the mounting structure securing the suspension system to the sidewall and stake pockets formed in the truck bed sidewalls.

The suspension mechanism 30 described above is housed within a casing 40 that is securely mounted to the cargo bed sidewall through conventional stake pockets 44 formed in the sidewalls of most trucks (see FIG. 6). The casing 40 consists primarily of a main base plate 40a having metal flanges 41, 42, 43 projecting from the stake pocket to which the hinge member, i.e. hinge arm 32 and bearing 33) are securely mounted. The second gear member 36 and associated spring 38 are likewise mounted on an arbor 39 provided on the flange members of the casing 40 (see FIG. 5). Thus, the casing 40 is easily mounted via bolts 45 to the existing structure of the cargo area sidewall without invading the storage area of the cargo space. It should be noted that the mechanism of this invention can likewise be mounted directly to the side rail of the truck bed independent of the stake pockets described above.

Figure 8:
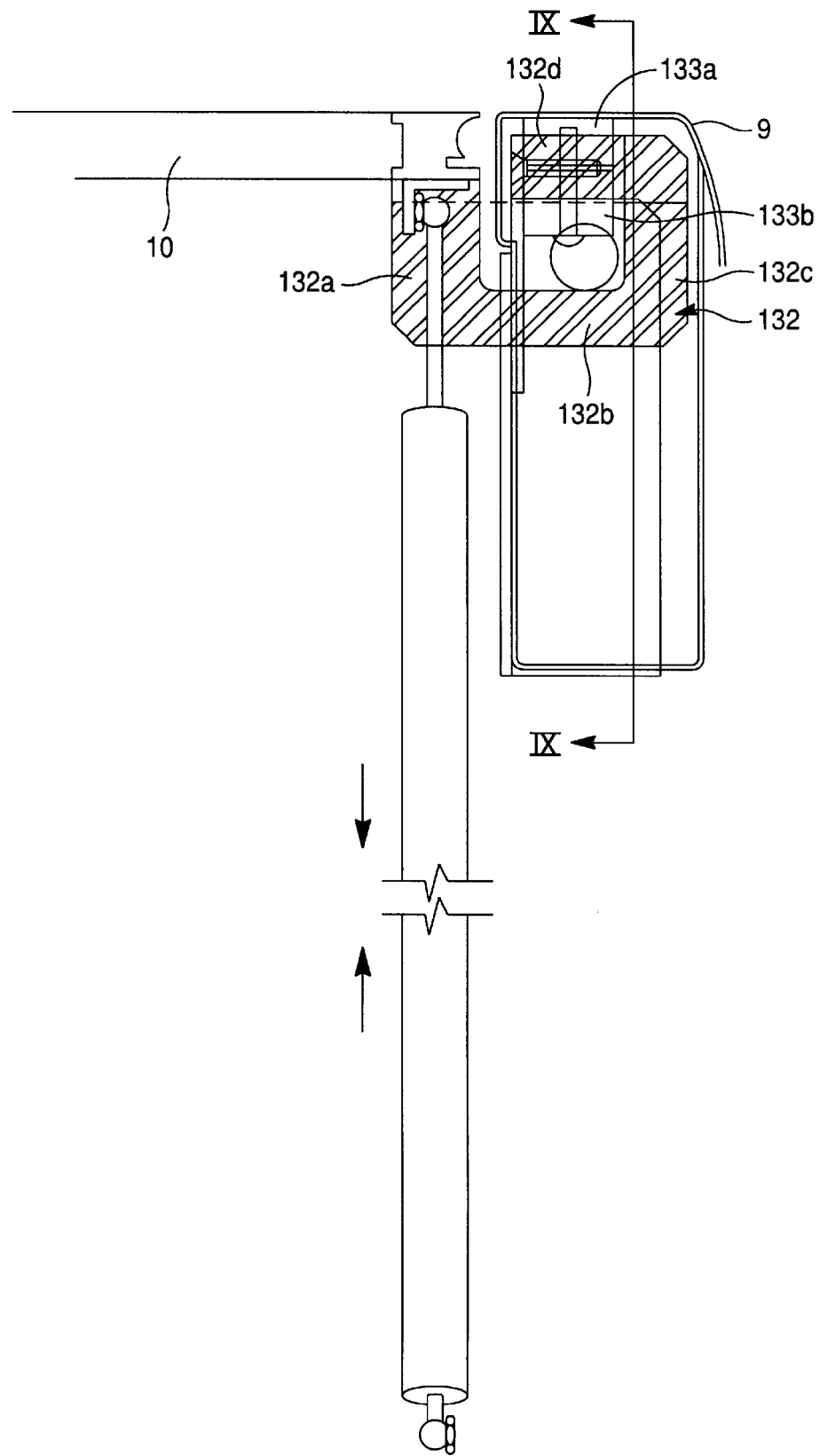
FIG. 8 is a second embodiment of the hinge member and suspension system of the present invention employing a piston and cylinder arrangement.
Figure 9:
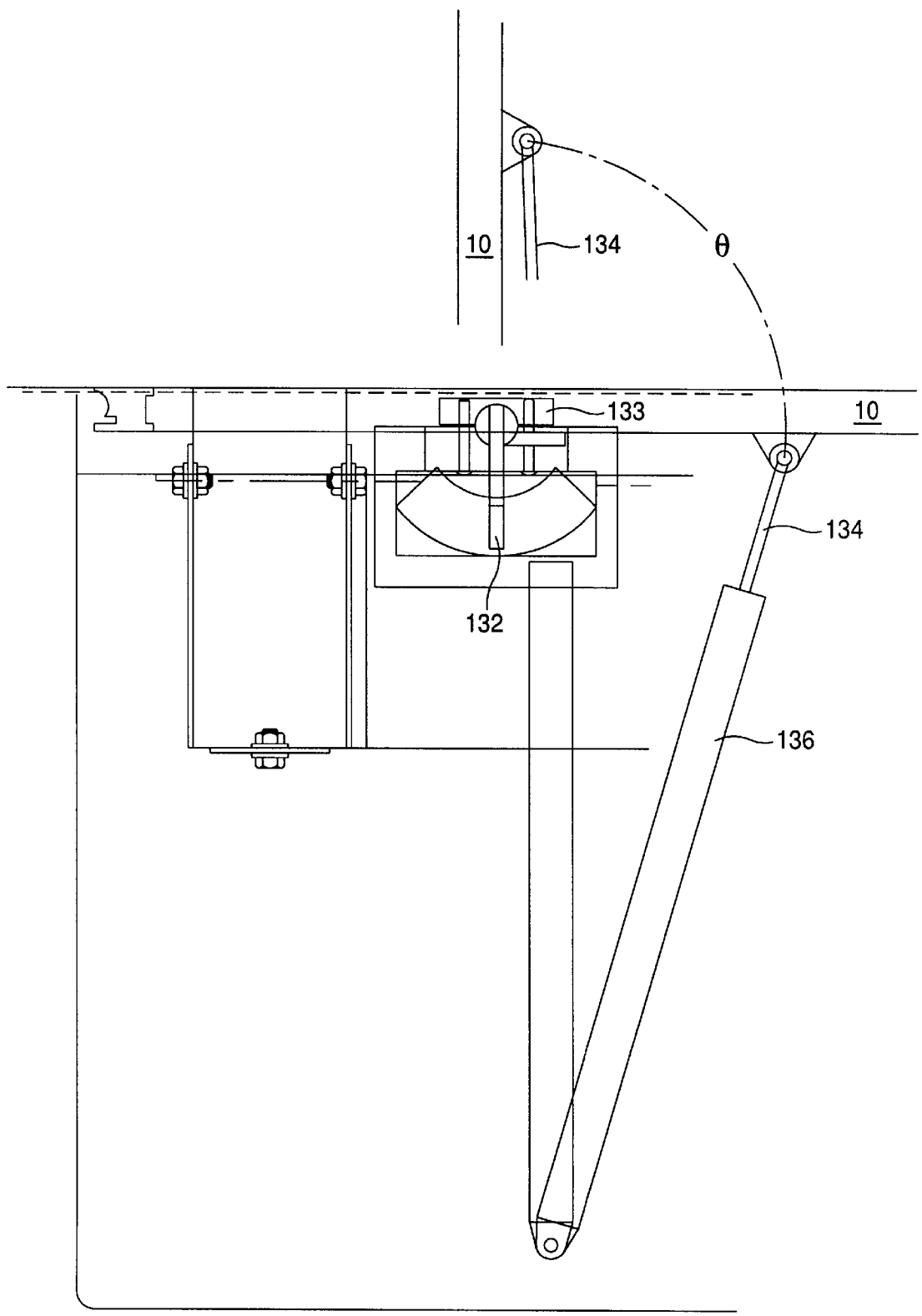
FIG. 9 is a cross sectional view of the second embodiment of FIG. 8 as taken along section line IX—IX of FIG. 8.

It must be understood that the counterbalancing suspension mechanism of this invention may be accomplished through a number of equivalent designs that are apparent to those of skill in the art. For example, a second embodiment of the suspension system of the present invention is shown in FIGS. 8 and 9. The second embodiment replaces the first and second gears 34, 36 and the power spring 38 of the first embodiment with a piston arrangement intended to accomplish the same objective, that is, to provide a uniform force of resistance or counterbalancing effect against the torque generated by the bedcover in an inclined, opened position.

Similar to the first embodiment, the hinge member of the second embodiment comprises a hinge arm 132 having first attachment leg 132a affixed to the bedcover 10, second and third legs 132b, 132c wrapping around the flange 9 of the truck bed sidewall, and a fourth leg 132d which engages a split bearing 133 mounted to the truck sidewall. In a structural deviation from the first embodiment, a piston and cylinder device is mounted between the first leg 132a of the hinge arm 132 and the truck sidewall to provide a suspension system during inclination of the bedcover 10. More specifically, a piston arm 134 is fixed to the hinge arm 132 in a pivoting manner at a point adjacent the bedcover 10. A cylinder 136 is fixed to the truck bed sidewall in the manner shown in FIG. 9.

From the foregoing description, it is clear that the present invention amounts to a substantial improvement over the prior art because the novel design set forth herein enables easy access to the cargo area of a truck bed without the limitation inherent in the prior art. The offset hinge and suspension system of this invention permits the bedcover to be pivoted to an angle of 90 degrees, and more importantly, enables stable positioning of the bedcover at an infinite number of positions along the path of travel of the bedcover without undue stress on the operator. The counterbalancing arrangement of the suspension system provides a uniform force acting against the weight of the bedcover 10 thus enable stability, convenience and versatility during use.

While the foregoing objects and advantages of the invention have been shown and described with respect to preferred embodiments, it will be understood by those of skill in the art that various changes in form and detail may be made without departing from the spirit and scope of the present invention.

What is claimed is:

1. A cover system for covering a cargo area of a truck, said cover system comprising:
    a rigid truck bedcover for covering a cargo area of a truck, and
    a hinge device for pivotally supporting said bedcover with respect to said cargo area and permitting said bedcover to pivot from a closed position enclosing said cargo area to an open position providing access to the cargo area, said hinge device comprising a C-shaped hinge arm pivoting about a hinge axis and adapted to be located inside the cargo bed area without modifying the sheet metal body of the truck, while enabling flush mounting of the bedcover to the inside of the truck bed rails,
    wherein torque is transmitted from said bedcover to said truck through said hinge device and said suspension system, wherein said hinge device comprises a hinge arm fixed to said bedcover and a bearing member mounted to said truck, and said suspension system comprises a first gear fixed to said hinge arm, a second gear matingly engaging said first gear, and a power spring having a first end fixed to said second gear and second end fixed to said truck.

2. The cover system of claim 1, further comprising a suspension system for supporting said truck bedcover with respect to said cargo area wherein said suspension system generates a counterbalancing force to counterbalance the force of said bedcover in said open position.

3. The cover system of claim 1, wherein said hinge device is disposed at two discrete locations on opposite sides of said rigid bedcover.

4. The cover system of claim 1, wherein said hinge device is formed to be mounted to one of a side rail or a stake pocket formed in a truck bed body.

5. The cover system of claim 2, wherein said suspension system comprises a resiliency means for providing a constant counterbalancing force when said bedcover is moved from said closed position to said open position.

6. The cover system of claim 2, wherein said suspension system retains said bedcover at a plurality of discrete fixed and stable locations throughout a range extending from said closed position to said open position.

7. The cover system of claim 2, wherein torque is transmitted from said bedcover to said truck through said hinge device and said suspension system, wherein said hinge device comprises a hinge arm fixed to said bedcover and a bearing member mounted to said truck, and said suspension system comprises a first gear fixed to said hinge arm, a second gear matingly engaging said first gear, and a power spring having a first end fixed to said second gear and a second end fixed to said truck.

8. The cover system of claim 7, wherein said bearing member is a split bearing member designed to provide variable frictional resistance with said hinge device.

9. A cover system for a covering a cargo area of a truck, said cover system comprising:
    a rigid truck bedcover for covering a cargo area of a truck, and
    a hinge device for pivotally supporting said bedcover with respect to said cargo area and permitting said bedcover to pivot from a closed position enclosing said cargo area to an open position providing access to the cargo area, said hinge device comprising a C-shaped hinge arm defining a hinge axis adapted to be located inside the cargo bed area and permitting integrity of seal operation without modifying the sheet metal body of the truck, while enabling flush mounting of the bedcover to the inside of the truck bed rails, and
    wherein said hinge device permits said bedcover to pivot from approximately zero degrees at said closed position to approximately ninety degrees at said open position.

10. The cover system of claim 9, further comprising a suspension system for retaining said bedcover at a plurality of discrete, fixed and stable locations throughout a range of positions extending from said closed position to said open position.

11. A cover system for a covering a cargo area of a truck, said cover system comprising:
    a rigid truck bedcover for covering a cargo area of a truck, and
    a suspension system for supporting said truck bedcover with respect to said cargo area, said suspension system generating a counterbalance force to counterbalance the force of said bedcover in an open position whereby said bedcover is inclined with respect to said cargo area to provide access to said cargo area, said suspension system comprising an offset hinge for pivotally supporting said bedcover with respect to said cargo area wherein a portion of said bedcover is cantilevered on both sides of said offset hinge to permit a front edge of said bedcover to pivot into the cargo area wherein said counterbalancing force is substantially uniform throughout a range of positions of said bedcover from a closed position where access to the cargo area is denied to said open position.

12. The cover system of claim 11, wherein said suspension system comprises a resiliency means for providing a constant counterbalancing force when said bedcover is moved from said closed position to said open position.

13. The cover system of claim 11, wherein said suspension system retains said bedcover throughout an infinite range of stable positions extending from said closed position at about zero degress to said open position at about 90 degrees.

14. The cover system of claim 13, wherein torque is transmitted from said bedcover to said truck through said hinge device and said suspension system, wherein said hinge device comprises a hinge arm fixed to said bedcover and a bearing member mounted to said truck, and said suspension system comprises a first gear fixed to said hinge arm, a second gear matingly engaging said first gear, and a power spring having a first end fixed to said second gear and a second end fixed to said truck.

15. The cover system of claim 14, wherein said bearing member is a split bearing member designed to provide variable frictional resistance with said hinge device.

* * * * *